June 4, 1963

H. W. ECKER 3,092,197

ELECTROMAGNETIC BALANCE

Filed March 5, 1962

INVENTOR.
HOWARD W. ECKER
BY
Caswell Lagaard & Wicks
ATTORNEYS

3,092,197
ELECTROMAGNETIC BALANCE
Howard W. Ecker, 702 W. Wheelock Parkway,
St. Paul, Minn.
Filed Mar. 5, 1962, Ser. No. 177,470
4 Claims. (Cl. 177—210)

The herein disclosed invention relates to electromagnetic balances and has for an object to provide a direct reading balance by means of which small quantities may be quickly and accurately weighed.

Another object of the invention resides in providing a construction which is small in size and weight and which is portable and can operate without the use of electric house current.

A still further object of the invention resides in providing a balance which is not subject to line voltage variations.

An object of the invention resides in providing a balance which is positive in action and which will not readily get out of order.

Another object of the invention resides in providing a balance which can be constructed at a reasonable cost.

A still further object of the invention resides in providing a balance utilizing transistors instead of tubes.

Other objects of the invention reside in the novel combination and arrangement of parts and in the details of construction hereinafter illustrated and/or described.

Figure 1:
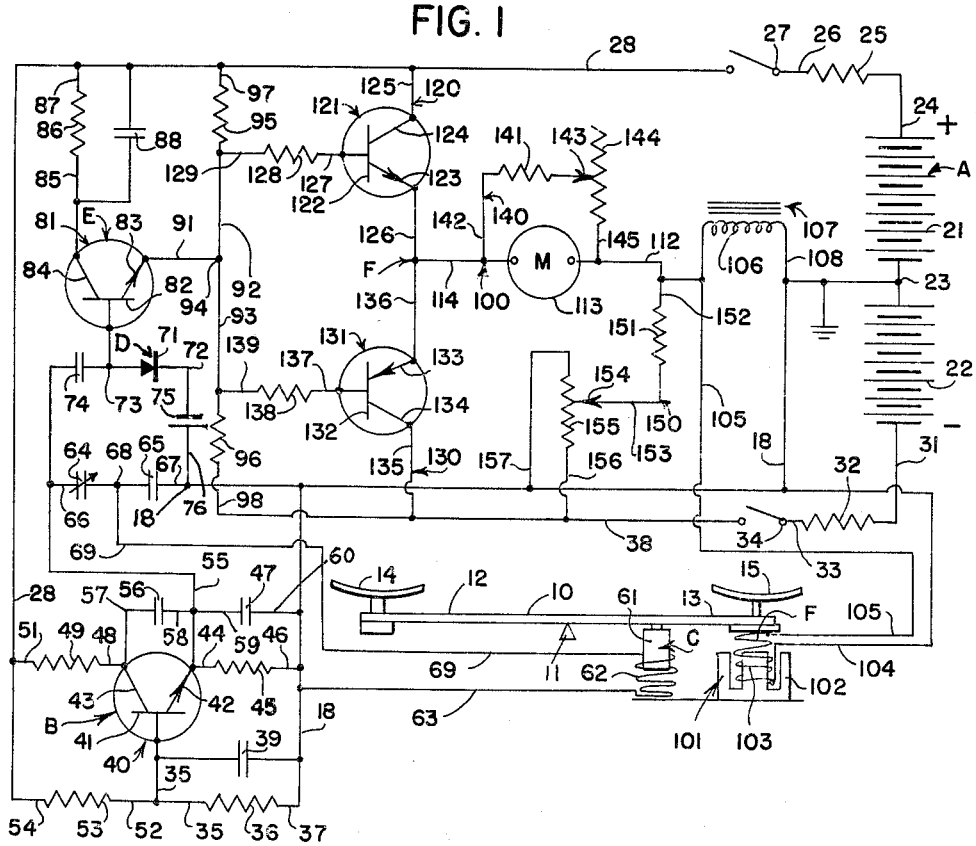
FIG. 1 is a wiring diagram of the electrical system of an electromagnetic balance illustrating an embodiment of the invention.
Figure 2:
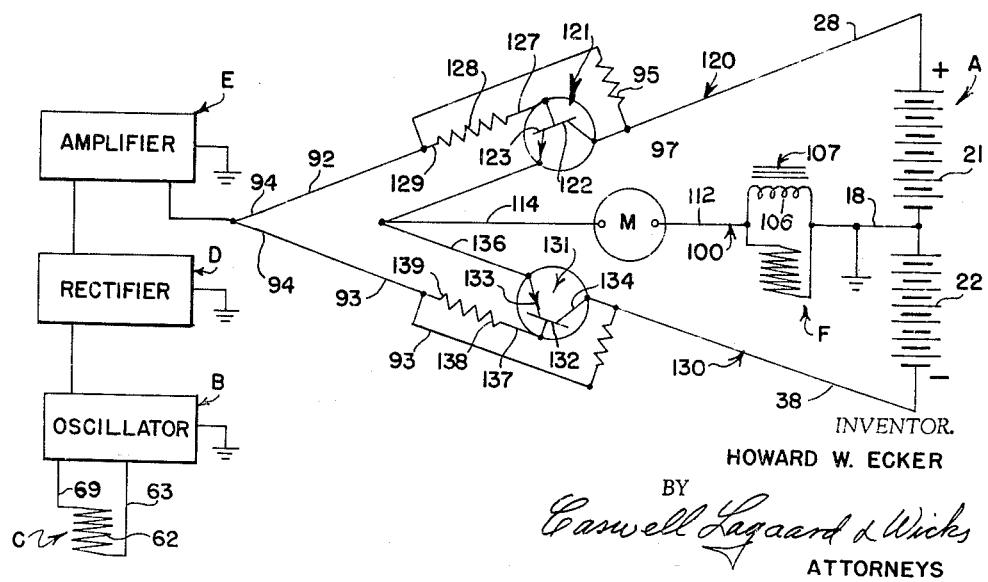
FIG. 2 is a simplified wiring diagram of the invention in which certain of the circuits are disclosed in block form and others arranged in a manner to be more readily comprehended.

The electrical system forming the basis of the instant invention may be used with any type of swinging beam balance and particularly of the type of balance disclosed in applicant's Patent No. 2,994,391, issued August 1, 1961, and incorporates an electrical system which may be substituted for that disclosed in the patent. The mechanical features of a balance with which applicant's invention may be used forming no particular feature of the instant invention have not been illustrated in detail nor will they be described except as they become useful in depicting the invention.

So much of the balance as becomes necessary to adequately describe the invention consists of a beam 10 pivoted for swinging movement about a fulcrum 11. This beam comprises arms 12 and 13 which support at their ends pans 14 and 15 on which may be placed the substance to be weighed and the weights used for extending the range of the balance beyond the range designated on the scale thereof. For further details of the balance reference may be had to the patent aforesaid.

The electrical system embodying the instant invention comprises a power supply A, an oscillator circuit B, sensing means C, rectifier means D, an amplifier E, and an electronic counterbalancing circuit F. These parts will now be described.

The power supply A comprises two batteries 21 and 22 of the same voltage which are connected in series, the negative element of battery 21 being connected to the positive element of battery 22. To the juncture 23 between the two batteries is connected a bus 18 which is grounded. The positive element of the battery 21 is connected by means of a conductor 24 to a resistor 25 which in turn is connected by means of a conductor 26 to a switch 27. Switch 27 is in turn connected to a positive bus 28. The negative element of battery 22 is similarly connected by means of a conductor 31 to a resistor 32 which in turn is connected by means of a conductor 33 to a switch 34. This switch is connected to a negative bus 38.

The oscillator circuit B is a Clapp, low capacitance series tuned circuit and comprises a transistor 40 which has a base 41 an emitter 42 and a collector 43. Emitter 42 is connected by means of a conductor 44 to a resistor 45 which in turn is connected by a conductor 46 to bus 18 and thus grounded. A capacitor 47 is connected by means of conductors 59 and 60 between emitter 42 and ground and shunts the resistor 45. The base 41 of transistor 40 is connected by means of a conductor 35 to a resistor 36 which in turn is connected by means of a conductor 37 to bus 18. Resistor 36 is shunted by means of a capacitor 39. The collector 43 of transistor 40 is connected by means of a conductor 48 to a dropping resistor 49 which in turn is connected by means of a conductor 51 to bus 28. Base 41 is further connected through conductor 35 and a conductor 52 to a dropping resistor 53, which in turn is connected by means of a conductor 54 to bus 28. The output of the oscillator B is fed to the sensing means C and to the rectifier means D by means of a conductor 55 connected to emitter 42. A capacitor 56 is connected across the collector 43 and emitter 42 by means of conductors 57 and 58.

The sensing means C includes a core 61 having an air-gap and a coil 62 movable relative to said core and in said air-gap. In the particular construction illustrated the core is attached to the arm 13 of the beam 10 and the coil 62 is stationary. One end of the coil 62 is connected by means of a conductor 63 to bus 18. Extending across the conductor 55 and bus 18 are two capacitors 64 and 65 in series of which the capacitor 64 is connected by means of a conductor 66 to conductor 55 and of which the capacitor 65 is connected by means of a conductor 67 to bus 18. The two capacitors are connected together by means of a conductor 68. The other end of the coil 62 is connected by means of a conductor 69 to the conductor 68. It will thus be seen that the oscillator B utilizes the inductance of the coil 62 and the capacitors 47 and 56 as the tuned emitter circuit of the Clapp oscillator. The values of the components are so selected that when the inductance of the coil 62 is a minimum oscillator B is in resonance and the output of the same is a minimum. When, however, the inductance of the coil 62 is increased the oscillator circuit is thrown out of resonance and the output of the same is materially increased.

The current produced by the oscillator B is alternating current and is rectified by the rectifying means D. This means includes a selenium rectifier 71 which has one terminal thereof connected by means of a conductor 72 to a bias cell 75. This cell in turn is connected by means of a conductor 76 to the bus 18. The other terminal of this rectifier is connected by means of a conductor 73 to a capacitor 74. This capacitor is directly connected to the output conductor 55 of the oscillator circuit B.

To produce sufficient current for the operation of the invention the amplifier circuit E is employed. This amplifier circuit includes a transistor 81 which has a base 82, an emitter 83 and a collector 84. The collector 84 is connected by means of a conductor 85 to a dropping resistor 86 which in turn is connected by means of a conductor 87 to the bus 28. The resistor 86 is shunted by means of a capacitor 88. Three conductors 91, 92 and 93 are employed for feeding the current from amplifier E to the counterbalancing system F. These conductors are connected together as indicated at 94. The emitter 83 is connected by means of conductor 91, to the conductor 93. The conductors 92 and 93 are connected to resistors 95 and 96. Resistor 95 is connected by means of a conductor 97 to the bus 28 while resistor 96 is connected by means of a conductor 98 to the bus 38.

The counterbalancing system F comprises a common output circuit 100, a positive branch circuit 120 and a negative branch circuit 130 which will now be described in detail.

The common output circuit 100 includes a counterbalancing device 101 which comprises a magnetized core 102 having an air-gap and in which a coil 103 is movable. The core 102 is fixed while the coil 103 moves with the beam 13. One end of the coil 103 is connected by means of a conductor 104 to the bus 18 and which is grounded. The other end of this coil is connected by means of a conductor 105 to an anti-hunting reactor 107. This reactor is further connected by means of a conductor 108 to the bus 18. The other end of this reactor is connected by means of a conductor 112 to one terminal of a milliammeter 113.

The positive branch circuit 120 comprises a transistor 121 having a base 122, an emitter 123 and a collector 124. The collector 124 is connected by means of a conductor 125 to the bus 28. The emitter 123 is connected by means of a conductor 126 to a common conductor 114 forming part of the common circuit 100 and which in turn is connected to the other terminal of the meter 113. The base 122 of the transistor 121 is connected by means of a conductor 127 to a resistor 128 which in turn is connected by means of a conductor 129 to conductor 92. The branch circuit 120 includes bus 28, switch 27, conductor 26, resistor 25, conductor 24 and battery A.

The negative branch circuit 130 comprises a transistor 131 which has a base 132, an emitter 133 and a collector 134. The collector 134 is connected by means of a conductor 135 to the bus 38 while the emitter 133 is connected by means of a conductor 136 to the conductor 114. Base 132 is connected by means of a conductor 137 to a resistor 138 while the said resistor is connected by means of a conductor 139 to the conductor 93. The branch circuit 130 also includes bus 38, switch 34, conductor 33, resistor 32, conductor 31 and battery 22.

For the purpose of calibrating the meter 113 a calibration circuit 140 is employed. This circuit includes a fixed resistor 141 which is connected by means of a conductor 142 to the conductor 114. Resistor 141 is further connected to the movable arm 143 of an adjustable resistor 144. This resistor is in turn connected by a conductor 145 to the conductor 112.

The scale of the meter 113 is calibrated so that the meter reads quantities of weight instead of electrical units. In order to bring the pointer of the meter to the zero mark of the scale a tare circuit 150 is employed. This circuit includes a fixed resistor 151 which is connected by means of a conductor 152 to the conductor 105. Said resistor is further connected by means of a conductor 153 to the movable arm 154 of an adjustable resistor 155. One end of this resistor is connected by means of a conductor 156 to bus 38 while the other end of this resistor is connected by means of a conductor 157 to bus 18.

The operation of the invention is as follows:

When the switches 27 and 34 are closed a circuit through the oscillator circuit B is established and the oscillator produces an alternating current which is fed to the rectifying means D and the amplifier E. With the tare circuit 150 and the calibration circuit 140 properly adjusted and no load on the pans 14 and 15 the beam 10 is in balance and the circuit B is in resonance. A minimum current hence flows in this circuit and which is rectified by rectifier means D and which in turn energizes the amplifier E. Amplifier E delivers current to the two branch circuits 120 and 130. The values of the components in these circuits are so selected that currents flowing to the bases 122 and 132 of the transistors 121 and 131 are extremely small and are equal. This being the case no current flow through the common circuit 100 and the meter 113 reads zero. As soon as a substance whose weight is to be measured is placed on the pan 15 the core 61 is moved relative to the coil 62 and the inductance of the coil 62 is altered. This throws the circuit B out of resonance and said circuit conducts heavily. Increased current flowing to the base 122 of transistor 121 the current flow in the positive circuit 120 is increased due to the fact that transistor 121 is an NPN transistor. In the same manner current flow to the base 132 of transistor 131 being increased blocks the flow of current in the negative branch circuit 130. Current now flows in the common circuit 100 and the coil 103 of the counterbalancing device 101 causes relative movement between said coil and the core 102 and the force applied to the beam through the substance on the pan 15 is counterbalanced and the beam returned to substantially normal position. The system comes to rest with current flowing in the common circuit 100, the amount thereof being proportional to the weight of the substance being weighed.

The advantages of the invention are manifest. The material being weighed may be placed on either pan and the counterweights, if used, placed on the other pan. The range of movement of the beam in either direction is maximum so that substances of considerable weight may be placed on the desired pan before placing counterbalancing weights on the other pan when needed, and without injuring the apparatus. The device draws an extremely small amount of current when not in use and only a nominal amount when in use, thereby economizing in battery consumption. No warm up time is needed and the device is instantly available for operation.

Applicant has found that the following values of components have produced highly satisfactory results in a balance used for measuring the weights of small quantities of material in the order of grains of weight.

21—Battery, 22½ volts
22—Battery, 22½ volts
25—Resistor, 100 ohms
32—Resistor, 100 ohms
36—Resistor, 56,000 ohms
39—Capacitor, .01 micro-farad
40—Transistor NPN 2N1302
45—Resistor, 12,000 ohms
47—Capacitor, 420 micro-micro farads
49—Resistor, 12,000 ohms
53—Resistor, 100,000 ohms
56—Capacitor, 420 micro-micro farads
64—Capacitor, 2–200 micro-micro farads
65—Capacitor, 10 micro-micro farads
71—Rectifier, 1N34
74—Capacitor, .03 micro-farad
75—Bias cell, 1½ volts
81—Transistor NPN 2N1302
86—Resistor, 1,000 ohms
88—Capacitor, .05 micro-farad
95—Resistor, 100,000 ohms
96—Resistor 100,000 ohms
106—Reactor 500 henries
113—Milliammeter 0–1
121—Transistor NPN 2N1302
128—Resistor, 100 ohms
131—Transistor PNP 2N1303
138—Resistor, 100 ohms
141—Resistor, 100 ohms
144—Resistor, 1,000 ohms
151—Resistor, 56,000 ohms
155—Resistor, 100,000 ohms Changes in the specific form of the invention, as herein described may be made within the scope of what is claimed without departing from the spirit of the invention.

Having described the invention, what is claimed as new and desired to be protected by Letters Patent is:

1. In an electric balance having a pivoted beam, a pan for the reception of the substance to be weighed connected to said beam, a magnetic counterbalancing device associated with said beam and having a core provided with an air-gap, a coil disposed in said air-gap, said coil and core being relatively movable, one thereof being fixed and the other being movable with said beam, said counterbalancing device exerting a counterbalancing force on said beam, sensing means comprising a core having an air-gap and a coil in said air-gap, one thereof being fixed and the other movable with said beam, a power supply means including two sources of direct current, a common conductor connecting the positive side of one source to the negative side of the other source, an electronic oscillator having a tuned resonant input circuit connected to said power supply means and an output circuit, said input circuit including the coil of said sensing means, the combination of (a) an electronic counterbalancing system including
(b) a common circuit connected to the common conductor of said power supply means,
(c) a positive branch circuit connected to the positive side of the source of direct current whose negative side is connected to the common circuit, and
(d) a negative branch circuit connected to the negative side of the other source of direct current, said branch circuits being connected to said common circuit,
(e) an NPN transistor and a PNP transistor, said transistors having input and output elements,
(f) the output elements of said NPN transistor being connected in said positive circuit, and
(g) the output elements of said PNP transistor being connected in said negative branch circuit,
(h) the coil of said counterbalancing device being energized by the current flowing in said common circuit,
(i) weight indicating means energized by the current flowing in said common circuit,
(j) and means for rectifying the output from said oscillator and connected to the input elements of said transistors.

2. In an electric balance having a pivoted beam, a pan for the reception of the substance to be weighed connected to said beam, a magnetic counterbalancing device associated with said beam and having a core provided with an air-gap, a coil disposed in said air-gap, said coil and core being relatively movable, one thereof being fixed and the other being movable with said beam, said counterbalancing device exerting a counterbalancing force on said beam, a sensing device comprising a core having an air-gap and a coil in said air-gap, one thereof being fixed and the other movable with said beam, power supply means including two sources of direct current, a common conductor connecting the positive side of one source to the negative side of the other source, an electronic oscillator having a tuned resonant input circuit connected to said power supply means and an output circuit, said input circuit including the coil of said actuating device, the combination of (a) an electronic counterbalancing system including
(b) a common circuit connected to the common conductor of said power supply means,
(k) branch circuits connected to the other terminals of said sources of direct current,
(e) an NPN transistor and a PNP transistor, said transistors having input and output elements,
(f) the ouptut elements of said NPN transistor being connected in said branch circuits,
(h) the coil of said counterbalancing device being energized by the current flowing in said common circuit,
(i) weight indicating means energized by the current flowing in said common circuit,
(j) and means for rectifying the output from said oscillator and connected to the input elements of said transistors.

3. In an electric balance having a pivoted beam, a pan for the reception of the substance to be weighed connected to said beam, a magnetic counterbalancing device associated with said beam and having a core provided with an air-gap, a coil disposed in said air-gap, said coil and core being relatively movable, one thereof being fixed and the other being movable with said beam, said counterbalancing device exerting a counterbalancing force on said beam, a sensing device comprising a core having an air-gap and a coil in said air-gap, one thereof being fixed and the other movable with said beam, power supply means including two sources of direct current, a common conductor connecting the positive side of one source to the negative side of the other source, an electronic oscillator having a tuned resonant input circuit connected to said power supply means and an output circuit, said input circuit including the coil of said actuating device, the combination of:

(a) an electronic counterbalancing system including
(b) a common circuit connected to the common conductor of said power supply means,
(c) a positive branch circuit connected to the positive side of the source of direct current whose negative side is connected to the common circuit and
(d) a negative branch circuit connected to the negative side of the other source of direct current, said branch circuits being connected to said common circuit,
(o) an NPN transistor and a PNP transistor, said transistors each having a base, an emitter and a collector,
(1) said NPN transistor being connected in said positive branch circuit with its collector connected to the positive side of the source of direct current in said positive branch circuit,
(m) said PNP transistor being connected in said negative branch circuit with its collector connected to the negative side of the source of direct current in said negative branch circuit,
(n) the emitters of said transistors being connected together and to the common circuit,
(h) the coil of said counterbalancing device being energized by the current flowing in said common circuit,
(i) weight indicating means energized by the current flowing in said common circuit
(p) and means for rectifying the output from said oscillator and connected to the bases of said transistors.

4. In an electric balance having a pivoted beam, a pan for the reception of the substance to be weighed connected to said beam, a magnetic counterbalancing device associated with said beam and having a core provided with an air-gap, a coil disposed in said air-gap, said coil and core being relatively movable, one thereof being fixed and the other being movable with said beam, said counterbalancing device exerting a counterbalancing force on said beam, sensing means comprising a core having an air-gap and a coil in said air-gap, one thereof being fixed and the other movable with said beam, a power supply means including two sources of direct current, a common conductor connecting the positive side of one source to the negative side of the other source, an electronic oscillator having a tuned resonant input circuit connected to said power supply means and an output circuit, said input circuit including the coil of said sensing means, the combination of (a) an electric counterbalancing system including
(b) a common circuit connected to the common conductor of said power supply means, (c) a positive branch circuit connected to the positive side of the source of direct current whose negative side is connected to the common circuit and (d) a negative branch circuit connected to the negative side of the other source of direct current, said branch circuits being connected to said common circuit, (e) an NPN transistor and a PNP transistor, said transistor having input and output elements, (f) the output elements of said NPN transistor being connected in said positive circuit and (g) the output elements of said PNP transistor being connected in said negative branch circuit, (h) the coil of said counterbalancing device being energized by the current flowing in said common circuit, (q) a meter disposed in said common circuit and serving as weight indicating means, (r) a tare circuit comprising a variable resistor connected between one of said branch circuits and the common conductor of said power supply, said variable resistor having a movable contact arm, (s) a resistor connected to said common circuit and to said movable contact arm, (j) and means for rectifying the output from said oscillator and connected to the input elements of said transistors.

References Cited in the file of this patent

UNITED STATES PATENTS

| | | |
|---|---|---|
| 2,371,040 | Fisher et al. | Mar. 6, 1945 |
| 2,602,660 | Shannon | July 8, 1952 |